H. E. POYNTER.
PLANTING DEVICE.
APPLICATION FILED JUNE 18, 1909.
992,056.  Patented May 9, 1911.
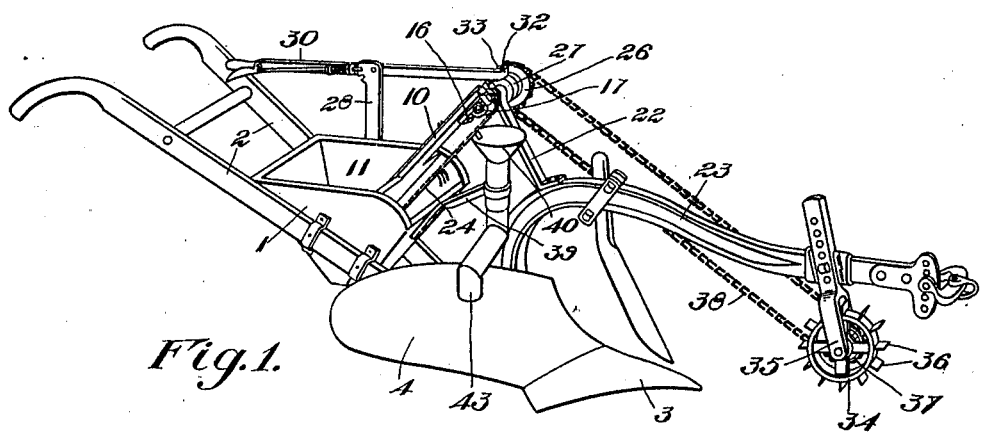
Fig. 1.
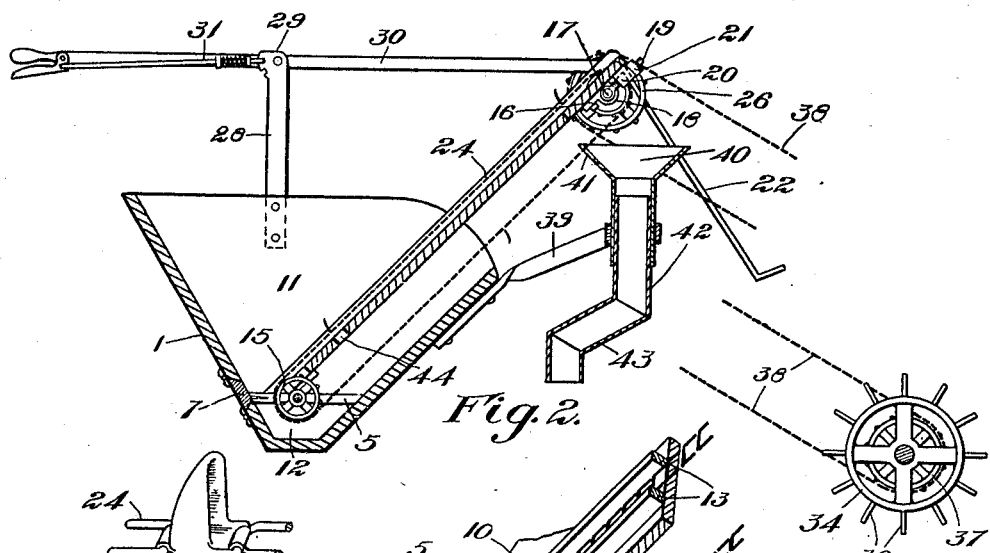
Fig. 2.
Fig. 4.
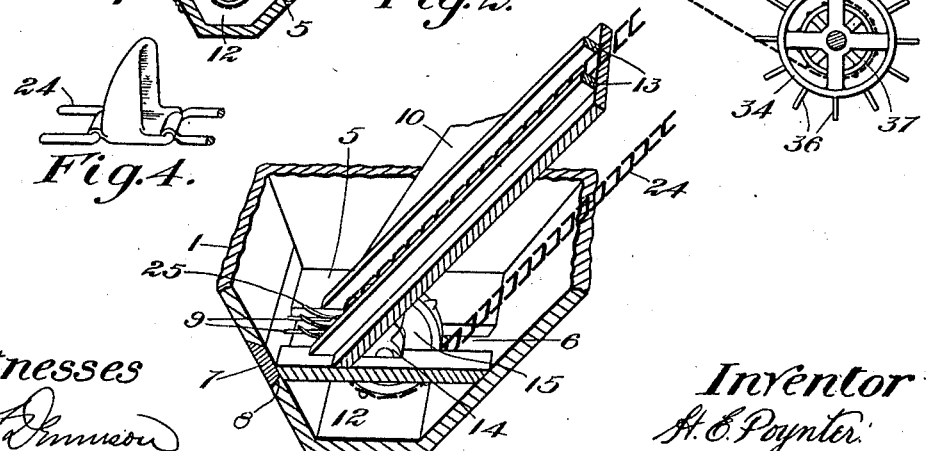
Fig. 3.
Witnesses
Inventor
H. E. Poynter.

UNITED STATES PATENT OFFICE.

HERBERT ERNEST POYNTER, OF WHITEVALE, ONTARIO, CANADA.

PLANTING DEVICE.

992,056.            Specification of Letters Patent.           Patented May 9, 1911.

Application filed June 18, 1909. Serial No. 503,004.

*To all whom it may concern:*

Be it known that I, HERBERT ERNEST POYNTER, a subject of the King of Great Britain, and resident of Whitevale, Pickering township, county of Ontario, in the Province of Ontario, in the Dominion of Canada, have invented certain new and useful Improvements in Planting Devices, of which the following is a specification.

The invention relates to improvements in planting devices, as described in the following specification and illustrated in the accompanying drawings that form part of the same.

The invention consists essentially in the novel construction and arrangement of parts whereby potatoes or seeds to be planted are carried from a suitable receptacle attached to a plow and deposited in the previously cut furrow so as to be covered by the earth turned over by the mold-board of the plow.

The objects of the invention are, to lessen the labor of planting potatoes, corn, beans and the like, to combine the operations of plowing and planting, thus saving a great deal of time, and to devise an attachment of a form suitable to be applied to an ordinary plow.

In the drawings, Figure 1 is a perspective view of my device shown attached to a plow. Fig. 2 is an enlarged longitudinal sectional view of my device. Fig. 3 is an enlarged perspective detail of a portion of the seed holding box or hopper, showing the means for taking a seed therefrom. Fig. 4 is an enlarged perspective detail of a slightly modified form of means for carrying the seed.

Like numerals of reference indicate corresponding parts in each figure.

Referring to the drawings, 1 is a hopper shaped box or receptacle fixedly secured between the handles 2 of the plow 3 immediately to the rear of the mold-board 4 and having a false bottom 5 therein, said false bottom having a central longitudinal slot 6 extending therethrough.

7 is a removable strip secured in the cross opening 8 in the rear side of the box 1 opposite the false bottom 5 and having the fingers 9 projecting inwardly therefrom into the rear end of the slot 6.

10 is a sloping partition secured to the false bottom 5 sloping upwardly and forwardly therefrom and dividing the interior of the hopper or box 1 into the separate compartments 11 and 12.

13 are guide-strips fixedly secured to the upper side of the partition 10.

14 are journal bearings fixedly secured to the under-side of the partition 10 close to the bottom thereof and supporting a sprocket wheel 15, said sprocket wheel extending through the slot 6 in the bottom 5.

16 are journal brackets adjustably secured to the under or front side of the partition 10 adjacent to the top.

17 is a shaft journaled in the brackets 16 and having mounted thereon, in central alinement with the sprocket 15, a sprocket 18.

19 are eye bolts surrounding the shaft 17 and having their threaded ends extending through the brackets 20 secured to the underside of the partition 10 and adjustably secured by the nuts 21.

22 is a brace rod rigidly secured to the upper end of the partition 10 and to the plow beam 23 and bracing the said partition very rigidly.

24 is a sprocket chain turning on the sprockets 15 and 18 and having several sets of prongs 25 secured thereto and extending outwardly therefrom, said prongs being adapted to pass upwardly through the slot 6 in the bottom 5 and between the fingers 9.

26 is a sprocket wheel loosely mounted on the outer end of the shaft 17 and having one member of a clutch mechanism turning therewith. 27 is the other member of the clutch mechanism fixedly secured to and turning with the shaft 17.

28 is an arm secured to the side of the box 1 and extending upwardly therefrom and having a notched quadrant 29 at the upper end thereof.

30 is a lever pivotally secured to the upper end of the arm 28 having a spring catch 31 adapted to engage the quadrant 29 and an outwardly bent end 32, said outwardly bent end being adapted to engage the dog 33 extending from the clutch member secured to the shaft 17 to throw said clutch out of operation.

34 is a land wheel suitably journaled in the arm 35 secured to the plow beam and having a plurality of projecting vanes 36 extending from its periphery, said vanes insuring the turning of said wheel by digging into the ground.

37 is a sprocket fixedly secured to the shaft of the land wheel outside of the jaw shaped end of the arm 35.

38 is a sprocket chain connecting the sprocket 37 with the sprocket 26.

39 is a bracket fixedly secured to the front side of the box 1 and supporting a hopper 40 immediately below the upper end of the partition 10, said hopper having a notch 41 cut in the side thereof adjacent to said partition to allow the fork members or prongs 25 to pass therethrough on the rotation of the chain 24.

42 is a chute adjustably secured in the tubular end of the hopper 40 and formed with an angularly projecting portion 43, said chute being adapted to be swung to any desired position or raised or lowered in order to change the position of the discharge end in relation to the mold-board of the plow.

In the operation of this device the land wheel 34, running upon the ground in front of the plow, turns and operates the chain 38, consequently rotating the sprocket 26 on the shaft 17. In planting the potatoes the compartment 11 of the box 1 is filled with seed potatoes and after the first furrow has been cut and the start of the second furrow has been made the chute 42 is adjusted so that the discharge end is arranged the desired distance from the land side of the plow. The clutch 27 is then released by operating the lever 30 and as the plow travels forward the prongs 25, rising through the slot 6, catch and elevate one or two of the seed potatoes, carrying them upwardly over the partition 10 between the guide-strips 13 and discharging them over the outer end thereof into the hopper 40. The potatoes falling into the hopper are carried through the chute 42 and dropped into the first furrow just in advance of the earth being turned over by the mold-board in cutting the second furrow. The potatoes are thus immediately covered over and require no further attention. The chute 42 may be adjusted so as to deposit the seeds at any desired point in the width of the furrow, that is to say, they may be dropped into the first furrow or on the surface of the upturned soil formed by the first furrow, so that any degree of depth of planting may be attained.

This device may be used with equal facility for planting corn, beans or other such like seeds which require to be planted a considerable distance apart and when seed of this kind is used the prong shaped members on the chain 24 are changed, substituting pocket shaped links as shown in Fig. 4. The strip 7 is also changed and replaced by a strip having an opening just wide enough to allow the passage of the pocket shaped links therethrough. A small hole or cross slot 44 is also provided in the partition 10 a short distance above the bottom 5 so that any of the seeds caught up by the links of the chain will not be carried up to the top of the elevator and deposited in the hopper.

It will be readily seen, that in planting corn or beans the pockets will take up a certain amount of seed and deposit them in advance of the turning furrow, the required distance apart, the number of pockets used on the chain being regulated according to the distance apart the operator desires to plant the seed.

A device of this kind will save a great deal of labor, as it is only necessary to go over a field once, whereas at present a field, after being plowed has to be harrowed before the seed can be sown, thus making it possible to cultivate much more ground with a limited amount of labor.

The device is very simple and may be attached to any form of plow and there are no delicate parts to get out of order and further there are no parts which can choke and prevent their proper feeding of the seed.

What I claim as my invention is:—

1. In a planting device, the combination with a plow having a suitable mold board, of a seed receptacle supported by said plow to the rear of the plowshare and said mold board, an endless carrier extending angularly upward and forwardly from said seed receptacle, and a chute suitably supported and receiving the seed from said endless carrier and having an offset lower end directing the seed to the furrow.

2. In a planting device, the combination with a plow having a suitable mold board, of a seed receptacle supported to the rear of the mold board, an endless carrier extending angularly upward and forwardly from said receptacle, a land wheel journaled from the plow beam in advance of the plow-share and operatively connected to said endless carrier, and a chute suitably supported and receiving the seed from said endless carrier and directing the seed to the side of the mold board.

3. In a planting device, the combination with a plow having a suitable mold board, of a seed receptacle supported to the rear of said mold board, a partition dividing the interior of said seed receptacle and extending angularly upward and forwardly from said receptacle, a shaft journaled at the outer end of said partition, a shaft journaled within said receptacle, an endless carrier extending around said shafts and over said partition, a land wheel secured to the plow beam in advance of the plow-share and operatively connected to the upper shaft of the said endless carrier, and a tubular chute supported beneath the upper end of said endless carrier and extending laterally and discharging the seed to the side of the mold board.

4. In a planting device, the combination with a plow having a suitable mold board and a land wheel, of a seed receptacle supported from said plow to the rear of said mold board, a frame extending upwardly from the plow frame and supported thereby, bearings supported in said frame, bearings within said seed receptacle, an endless carrier supported by said bearings, and a chain and sprocket mechanism operatively connecting said land wheel and said endless carrier.

5. In a device of the class described in combination, a plow having a suitable mold board and a land wheel, a seed receptacle supported to the rear of said mold board and said plow, bearings within said seed receptacle, a shaft journaled in said bearings, an angular frame extending upwardly from within said seed receptacle and from the plow beam, adjustable bearings supported in said frame, a shaft journaled in said adjustable bearings, an endless carrier connecting said shaft extending into said seed receptacle, a sprocket wheel mounted on said shaft, a sprocket wheel operating coincidently with said land wheel, a chain connecting said sprockets, a clutch mechanism, and an operating lever connected with said clutch mechanism and supported from said plow.

6. In a device of the class described, in combination, a plow having a suitable mold board, a seed receptacle, a tubular chute having a hopper top, said chute being supported from the seed receptacle, a tubular extension pivotally secured to the lower end of said chute and offset therefrom, means for delivering the seed from said seed receptacle to said hopper top, and means for operating said delivery means.

Signed at the city of Toronto, Canada, this 27th day of May, 1909.

HERBERT ERNEST POYNTER.

Witnesses:
H. DENNISON,
E. HERON.

Copies of this patent may be obtained for five cents each, by addressing the "Commissioner of Patents, Washington, D. C."